United States Patent
Frankel et al.

(10) Patent No.: US 9,358,494 B2
(45) Date of Patent: Jun. 7, 2016

(54) END OF SERVICE LIFE INDICATING SYSTEMS FOR LAYERED FILTER CARTRIDGES

(71) Applicant: 3M INNOVATIVE PROPERTIES COMPANY, St. Paul, MN (US)

(72) Inventors: Kevin A. Frankel, Woodbury, MN (US); Maria L. Zelinsky, Eagan, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 54 days.

(21) Appl. No.: 14/362,522

(22) PCT Filed: Dec. 4, 2012

(86) PCT No.: PCT/US2012/067703
§ 371 (c)(1),
(2) Date: Jun. 3, 2014

(87) PCT Pub. No.: WO2013/090052
PCT Pub. Date: Jun. 20, 2013

(65) Prior Publication Data
US 2014/0326134 A1 Nov. 6, 2014

Related U.S. Application Data

(60) Provisional application No. 61/569,342, filed on Dec. 12, 2011.

(51) Int. Cl.
*B01D 53/04* (2006.01)
*A62B 18/08* (2006.01)
(Continued)

(52) U.S. Cl.
CPC ............ *B01D 53/0407* (2013.01); *A62B 9/006* (2013.01); *A62B 18/088* (2013.01);
(Continued)

(58) Field of Classification Search
CPC ............... B01D 53/04; B01D 53/0407; B01D 2253/102; B01D 2253/104; B01D 2253/106; B01D 2253/108; B01D 2259/4145; B01D 2259/4146; B01D 2259/4148; B01D 46/4254; B01D 53/0415; A62B 18/088; A62B 23/02; A62B 9/006
See application file for complete search history.

(56) References Cited

U.S. PATENT DOCUMENTS

| 1,537,519 A | 5/1925 | Yablick |
| 3,966,440 A | 6/1976 | Roberts |

(Continued)

FOREIGN PATENT DOCUMENTS

| JP | 2002-102367 | 4/2002 |
| WO | WO 95-12432 | 5/1995 |

(Continued)

OTHER PUBLICATIONS

Belyakova, "Sorption of Vapors of Various Substances by Hypercrosslinked "Styrosorb" Polystyrenes", Advances in Colloid and Interface Science, 1986, vol. 25, pp. 249-266.

(Continued)

*Primary Examiner* — Robert Clemente
(74) *Attorney, Agent, or Firm* — Jeffrey M. Olofson

(57) ABSTRACT

Layered filtered cartridge systems with an End of Service Life Indicating system include a filter cartridge that includes filter media. The filter media includes a multi-layer construction, of a first sorbent layer, a second sorbent layer, and a sensing element adjacent to the first and second sorbent layers such that an indicating element of the sensing element is located at the interface between the first and second sorbent layers. The second sorbent layer has a higher adsorption capacity and/or higher adsorption rate than the first sorbent layer. The sensing element indicates the passage of an adsorption wavefront through the filter cartridge.

21 Claims, 1 Drawing Sheet

(51) Int. Cl.
*A62B 9/00* (2006.01)
*B01D 45/16* (2006.01)
*B01D 46/24* (2006.01)
*B01D 46/42* (2006.01)
*B01D 53/30* (2006.01)

(52) U.S. Cl.
CPC .......... *B01D 45/16* (2013.01); *B01D 46/2411* (2013.01); *B01D 46/4254* (2013.01); *B01D 53/0415* (2013.01); *B01D 53/0454* (2013.01); *B01D 53/30* (2013.01); *B01D 2253/102* (2013.01); *B01D 2253/104* (2013.01); *B01D 2253/106* (2013.01); *B01D 2253/108* (2013.01); *B01D 2253/204* (2013.01); *B01D 2257/70* (2013.01); *B01D 2259/4146* (2013.01); *B01D 2275/10* (2013.01)

(56) References Cited

U.S. PATENT DOCUMENTS

| | | |
|---|---|---|
| 3,971,373 A | 7/1976 | Braun |
| 4,146,887 A | 3/1979 | Magnante |
| 4,154,586 A | 5/1979 | Jones |
| 4,208,194 A | 6/1980 | Nelson |
| 4,365,627 A | 12/1982 | Wing |
| 4,530,706 A | 7/1985 | Jones |
| 4,684,380 A | 8/1987 | Leichnitz |
| 4,847,594 A | 7/1989 | Stetter |
| 4,873,970 A | 10/1989 | Freidank |
| 4,948,639 A | 8/1990 | Brooker |
| 5,297,544 A | 3/1994 | May |
| 5,323,774 A | 6/1994 | Fehlauer |
| 5,512,882 A | 4/1996 | Stetter |
| 5,660,173 A | 8/1997 | Newton |
| 5,714,126 A | 2/1998 | Furnd |
| 5,944,873 A | 8/1999 | Jager |
| 6,040,777 A | 3/2000 | Ammann |
| 6,344,071 B1 | 2/2002 | Smith |
| 6,375,725 B1 | 4/2002 | Bernard |
| 6,497,756 B1 | 12/2002 | Curado |
| 7,201,036 B2 | 4/2007 | Custer |
| 7,442,237 B1 | 10/2008 | Gardner |
| 7,449,146 B2 | 11/2008 | Rakow |
| 7,503,962 B2 | 3/2009 | Attar |
| 7,556,774 B2 | 7/2009 | Rakow |
| 7,875,100 B2 | 1/2011 | Wright |
| 8,293,340 B2 | 10/2012 | David |
| 2004/0189982 A1 | 9/2004 | Galarneau |
| 2004/0204915 A1 | 10/2004 | Steinthal |
| 2004/0223876 A1 | 11/2004 | Kirollos |
| 2006/0096911 A1 | 5/2006 | Brey |
| 2007/0137491 A1 | 6/2007 | Attar |
| 2008/0063575 A1 | 3/2008 | Rakow |
| 2008/0063874 A1 | 3/2008 | Rakow |
| 2010/0153023 A1 | 6/2010 | Parham |
| 2010/0294272 A1 | 11/2010 | Holmquist-Brown |
| 2011/0094514 A1 | 4/2011 | Rakow |
| 2013/0169967 A1 | 7/2013 | Kanukurthy |

FOREIGN PATENT DOCUMENTS

| | | |
|---|---|---|
| WO | WO 2006-052694 | 5/2006 |
| WO | WO 2009-029426 | 3/2009 |

OTHER PUBLICATIONS

Davankov, "Structure and properties of porous hypercrosslinked polystyrene sorbents Styrosorbl", Pure and Appl. Chem., 1989, vol. 61, No. 11, pp. 1881-1888.

Wood, "Estimating Service Lives of Organic Vapor Cartridges", Journal of the American Industrial Hygiene Association, 1994, vol. 55, No. 1, pp. 11-15.

International Search Report for PCT International Application No. PCT/US2012/067703 mailed on Mar. 19, 2013, 3 pages.

END OF SERVICE LIFE INDICATING SYSTEMS FOR LAYERED FILTER CARTRIDGES

FIELD OF THE DISCLOSURE

This disclosure relates generally to methods for filtering contaminants from a gas using filter cartridges, and end of service life indicators for determining the end of useful life for the filter cartridges.

BACKGROUND

A variety of air purification systems have been developed to protect people from hazardous air contaminants. Among these air purification systems are a wide range of air purifying respirators that are designed to filter out or adsorb contaminants present in the air. Typically these air purifying respirators contain a filter media, a filter body, or some combination of filter media and filter body. Upon use of the respirator, the contaminants become absorbed by the filter media or attached or trapped by the filter body. Eventually, the filter media or filter body becomes saturated and the ability of the respirator to remove the hazardous air contaminants begins to diminish.

During extended exposure to an environment containing hazardous air contaminants, such as, for example, continuous or repeated worker exposure to such environments, techniques are necessary to determine the useful service life of a respirator. One technique that has been developed is based upon the time in service for a respirator. In this technique, respirators or the air purifying filters are replaced after a certain period of time in service, based upon, for example, a mathematical model such as that of Wood et al. in the *Journal of the American Industrial Hygiene Association*, Volume 55(1), pages 11-15, (1994). However, this technique does not take into account variations in contaminant level or flow rates through the respirator and therefore may result in the respirator or filter elements being changed too early (which is wasteful) or too late (which may present a danger to the user).

Examples of filter cartridges that contain layers or mixtures of different sorbent materials include U.S. Pat. No. 5,660,173 (Newton) which describes a cylindrical canister for use in conjunction with a gas mask that includes a frustum shaped carbon bed and a layered array of different size carbon particles in the carbon bed. U.S. Pat. No. 5,714,126 (Frund), describes a respirator filter system for filtering toxic agents that includes a cartridge containing a layer of an unimpregnated activated carbon, a layer of an activated carbon impregnated with sulfate, molybdenum and copper or zinc, and a HEPA filter. U.S. Pat. No. 6,344,071 (Smith et al.) describes filter media that includes at least two kinds of filter media, a first plurality of filter media particles containing a transition metal impregnant and a second plurality of filter media particles containing a tertiary amine impregnant.

A wide variety of End of Service Life Indicators (ESLI) have been developed for use with the filter cartridges of respirators. Generally, the ESLIs are described as being passive or active. Passive ESLIs are ones where a change in the indicator (often a color change) is caused by exposure to an analyte when a sorbent for that analyte is near depletion. Active ESLIs are ones that incorporate an electronic sensor to monitor a gas stream for an analyte and upon detection of the analyte because of sorbent depletion, to produce a warning signal.

SUMMARY

Disclosed herein are End of Service Life Indicators for layered filtered cartridge systems. Included are filter cartridges capable of removing contaminants from a gas medium comprising a sealed cartridge housing that comprises a gas inlet, filter media, and a gas outlet. The filter media comprises a multi-layer construction, the multi-layer construction comprises a first sorbent layer, a second sorbent layer closer in proximity to the gas outlet than the first sorbent layer, and a sensing element adjacent to the first and second sorbent layers such that an indicating element of the sensing element is located at the interface between the first and second sorbent layers. In some embodiments the sensing element is an electronic sensing element, in other embodiments, the sensing element is a colorimetric sensing element. In some embodiments, the second sorbent layer has a higher adsorption capacity and/or higher adsorption rate than the first sorbent layer.

Also included are methods of filtering contaminants from a gas. These methods comprise providing a filter cartridge, causing gas to flow through the filter cartridge, detecting a sensing response in the sensing element, and replacing the filter cartridge. The filter cartridges comprise a sealed cartridge housing that comprises a gas inlet, filter media, and a gas outlet. The filter media comprises a multi-layer construction, the multi-layer construction comprises a first sorbent layer, a second sorbent layer closer in proximity to the gas outlet than the first sorbent layer, and a sensing element adjacent to the first and second sorbent layers such that an indicating element of the sensing element is located at the interface between the first and second sorbent layers. In some embodiments the sensing element is an electronic sensing element, in other embodiments, the sensing element is a colorimetric sensing element. In some embodiments, the second sorbent layer has a higher adsorption capacity and/or higher adsorption rate than the first sorbent layer.

BRIEF DESCRIPTION OF THE DRAWINGS

The present application may be more completely understood in consideration of the following detailed description of various embodiments of the disclosure in connection with the accompanying drawings.

Figure 1:
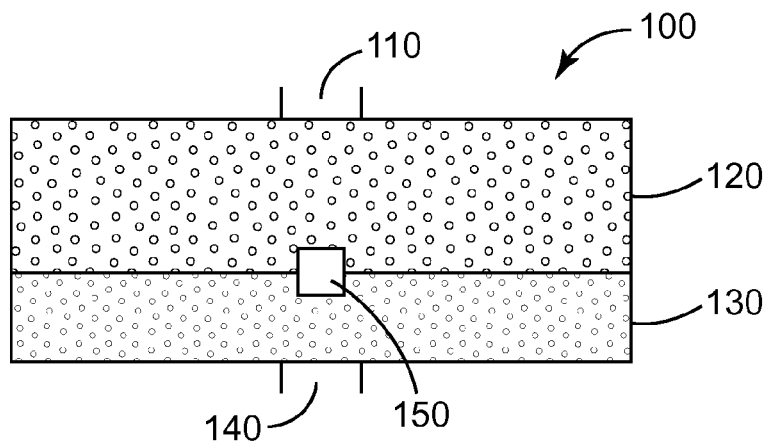
FIG. 1 shows a cross sectional view of an embodiment of a filter cartridge of this disclosure.

In the following description of the illustrated embodiments, reference is made to the accompanying drawings, in which is shown by way of illustration, various embodiments in which the disclosure may be practiced. It is to be understood that the embodiments may be utilized and structural changes may be made without departing from the scope of the present disclosure. The figures are not necessarily to scale. Like numbers used in the figures refer to like components. However, it will be understood that the use of a number to refer to a component in a given figure is not intended to limit the component in another figure labeled with the same number.

DETAILED DESCRIPTION

A variety of air purification systems have been developed to protect people from hazardous air contaminants Among these air purification systems are a wide range of air purifying respirators that are designed to filter out or adsorb contaminants present in the air. This sorption can be physical or chemical. These air purification systems can be passive, meaning that the user's breathing draws the air through the respirator, or powered, meaning that a mechanical device such as a fan draws the air through the respirator. Typically these air purifying respirators utilize filter cartridges. Generally these filter cartridges contain a filter media, a filter body, or some combination of filter media and filter body. Upon use of the respirator, the contaminants become absorbed by the filter media or attached or trapped by the filter body. Eventually, the filter media or filter body becomes saturated and the ability of the respirator to remove the hazardous air contaminants begins to diminish.

During extended exposure to an environment containing hazardous air contaminants, such as, for example, continuous or repeated worker exposure to such environments, techniques are necessary to determine the useful service life of a respirator. One technique that has been developed is based upon the time in service for a respirator, using a mathematical model as described by Wood et al. in the *Journal of the American Industrial Hygiene Association*, Volume 55(1), pages 11-15, (1994). In this technique, respirators or the air purifying filters are replaced after a certain period of time in service. However, this technique does not take into account variations in contaminant level or flow rates through the respirator and therefore may result in the respirator or filter elements being changed too early (which is wasteful) or too late (which may present a danger to the user).

A wide variety of End of Service Life Indicators (ESLI) have been developed for use with the filter cartridges of respirators. Generally, the ESLIs are described as being passive or active. Passive ESLIs are ones where a change in the indicator (often a color change) is caused by exposure to an analyte when a sorbent for that analyte is near depletion. Active ESLIs are ones that incorporate an electronic sensor to monitor a gas stream for an analyte and upon detection of the analyte because of sorbent depletion, to produce a warning signal.

A need exists for ESLIs that are able to indicate that the cartridge should be replaced when the majority of the cartridge sorbent has been exhausted, but before the cartridge sorbent is completely exhausted. This permits the cartridge to be used for the entire useful life (eliminates wasting portions of the usable sorbent in the cartridge) and yet provides a safety margin to the user (when the indicator is activated there is still a usable layer of sorbent to protect the user).

Disclosed herein are filter cartridge systems for purification of gaseous media that include layered filter cartridges and a sensing element located within the layered filter cartridge. The sensing element is located within the filter cartridge in such way that upon depletion of one layer or group of layers the sensing element is triggered, and a second layer or group of layers begins to purify the gaseous media. The second layer or group of layers is smaller than the first layer or group of layers but the second layer or group of layers has a higher adsorption capacity and/or higher adsorption rate than the first sorbent layer. This second layer or group of layers, though smaller than the first layer or group of layers is able to provide protection to the user until the cartridge can be changed.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. For example, reference to "a layer" encompasses embodiments having one, two or more layers. As used in this specification and the appended claims, the term "or" is generally employed in its sense including "and/or" unless the content clearly dictates otherwise.

As used herein the term "sensing element" refers to an element or collection of elements that is optically responsive to an analyte, for example, by undergoing a change in at least one of its optical properties (as may be manifested by a colorimetric change, a change in brightness, intensity of reflected light, etc.) when exposed to the analyte. The sensing element includes at least one "indicator element" and may include other elements as well. As used herein, the term "indicator element" refers to an element that upon exposure to an analyte, such as an organic vapor or an acid, undergoes a detectable change, typically an optical change. When the visual change is a change in color, the indicator is said to be "colorimetric". If the sensing element only comprises an indicator element, the terms are used interchangeably.

As used herein, the term "adsorption wavefront" refers to the layer of a gas containing contaminants that has passed through a sorbent layer. Layers of gas that have passed through a sorbent layer and do not contain contaminants are not the adsorption wavefront.

As used herein, the term "adjacent" when referring to layers or other elements, means that the layers or other elements are in close proximity to each other with no empty space between them. The layers or other elements may be touching or there may be intervening layers or other elements.

As used herein, the term "breathing headpiece" when referring to a respirator, means an apparatus to which purified air is supplied that is worn by a person, such breathing head pieces include for example facepieces which fit snugly over at least the respiratory passages (nose and mouth) of a person, as well as loose fitting facepieces. Examples of breathing headpieces include but are not limited to, elastomeric facepiece respirators, full face respirators, head covers such as soft hoods or hard headtops and other suitable respirator systems.

As used herein, the term "hose" when referring to a powered respirator, means a device that includes a conduit that has fluid impermeable wall(s) through which air can travel for delivering filtered air from a clean air supply source (such as a filter cartridge) to breathing headpiece.

Filter cartridges of the present disclosure are capable of removing contaminants from a gas medium and comprise a sealed cartridge housing. This housing contains the elements of the filter cartridge, holds the elements in the proper configuration, and protects the elements from exposure to the contaminants of the gas medium except for the directed flow of the gas medium through the filter cartridge. The elements of the filter cartridge contained within the sealed cartridge housing comprise at least a gas inlet, filter media, and a gas outlet. The filter media comprises a multi-layer construction comprising at least a first sorbent layer, a second sorbent layer closer in proximity to the gas outlet than the first sorbent layer, and a sensing element adjacent to the first and second sorbent layers such that an indicating element of the sensing element is located at the interface between the first and second sorbent layers. Each of these elements is described in greater detail below.

The use of a sealed cartridge housing permits the components of the filter cartridge to be held in fluid communication with each other and protects the components from impact, damage, etc. The housing is typically designed to be impermeable to the fluid to be filtered under the conditions in which the filter cartridge is to be used. Some potentially suitable materials for the housing may include plastics, metals, composites, etc.

Generally, the only openings in the sealed cartridge housing are the gas inlet which is fluid communication with the external environment and the gas outlet which is in fluid communication with the user, either directly or indirectly.

The gas inlet may be a simple orifice or series of orifices or it may be a more complex apparatus such as, for example, it may contain a pre-filter or screen to reduce the flow of particulates into the filter cartridge. Examples of pre-filters include, for example, fibrous webs, meshes, foams, nonwoven fabrics, and the like. The pre-filters may be removable so that they can be removed and cleaned or replaced. Examples of suitable screens include, for example, metal or plastic grids which may permanently affixed to the gas inlet or may be removable. In certain filter cartridge configurations, it may be possible for there to be more than one gas inlet.

The other opening in the filter cartridge housing is the gas outlet. Depending upon the type of air purification system with which the filter cartridge is used, the gas outlet may have a variety of shapes and configurations. If the filter cartridge is used in a passive respirator system, the gas outlet may be a single orifice or it may be a series of orifices. Additionally, the outlet may contain a filter or screen to prevent the flow of particulates or dust from the filter media reaching the user. Examples of suitable filters include, for example, fibrous webs, meshes, foams, nonwoven fabrics, and the like. The filters may be removable so that they can be removed and cleaned or replaced. Examples of suitable screens include, for example, metal or plastic grids which may permanently affixed to the gas inlet or may be removable. If the filter cartridge is used in a powered respirator system, the gas outlet is typically a single opening, but in some embodiments it may comprise a series of openings. In some embodiments the gas outlet is an outlet port that can connect the filter cartridge housing to a hose or other connecting apparatus to supply purified air to a breathing headpiece or other device. Often the gas outlet is a cylindrical opening, but other shapes and contours may be used. The opening may also include structures designed to releasably attach the filter cartridge to, for example, the hose or other connecting apparatus.

The filter media comprises a multi-layer construction comprising at least a first sorbent layer, a second sorbent layer closer in proximity to the gas outlet than the first sorbent layer, and a sensing element adjacent to the first and second sorbent layers. At least one indicator element of the sensing element is located at the interface between the first sorbent layer and the second sorbent layer. Each of the first and second sorbent layers may be a single layer or may comprise a variety of sublayers. Also, in addition to these two sorbent layers, additional layers may also be present. Examples of suitable additional layers that can be present include, for example, additional sorbent layers, and particulate filters such as fibrous webs, meshes, foams, nonwoven fabrics, and the like.

The first sorbent layer comprises at least one sorbent material. As used herein, the term "sorbent material" refers to a substance capable of absorbing or adsorbing an organic vapor. This absorption or adsorption can be either physical (the organic vapor becomes physically trapped on or within the sorbent material) or chemical (the organic vapor chemically interacts with sorbent material and becomes trapped).

A wide variety of materials may be suitable for use as the sorbent material. The sorbent media desirably is sufficiently porous to permit the ready flow of air or other gases therethrough, and may be in the form of a finely-divided solid (e.g., powder, beads, flakes, granules or agglomerates) or porous solid (e.g., an open-celled foam or a porous monolithic material). Typically the sorbent material is granular.

The sorbent material may be a single material or it may comprise a mixture of materials. Examples of suitable sorbent materials include, for example, activated carbon, treated activated carbon, alumina, silica gel, hopcalite, molecular sieves, metal-organic frameworks, templated materials, or other known sorbent materials, or a combination thereof. Additionally, as described above, the first sorbent layer may comprise a variety of sublayers. Each of these sublayers may be the same or different sorbent material.

Especially desirable sorbent media materials include activated carbon; alumina and other metal oxides that can remove a vapor of interest by adsorption; clay and other minerals treated with acidic solutions such as acetic acid or alkaline solutions such as aqueous sodium hydroxide; molecular sieves and other zeolites; other inorganic sorbents such as silica; and organic sorbents including hypercrosslinked systems, such as the highly crosslinked styrenic polymers known as "Styrosorbs" (as described, for example, in V. A. Davankov and P. Tsyurupa, *Pure and Appl. Chem.*, vol. 61, pp. 1881-89 (1989) and in L. D. Belyakova, T. I. Schevchenko, V. A. Davankov and M. P. Tsyurupa, *Adv. in Colloid and Interface Sci.* vol. 25, pp. 249-66, (1986)). Activated carbon and alumina are particularly desirable sorbent media. Mixtures of sorbent media can be employed, e.g., to absorb mixtures of vapors of interest. If in a finely divided form, the sorbent particle size can vary a great deal and usually will be chosen based in part on the intended service conditions. As a general guide, finely-divided sorbent media particles may vary in size from about 4 to about 5000 micrometers average diameter, e.g., from about 30 to about 1500 micrometers average diameter. Mixtures of sorbent media particles having different size ranges can also be employed, (e.g., in a bimodal mixture of sorbent media particles or in a multilayer arrangement employing larger sorbent particles in an upstream layer and smaller sorbent particles in a downstream layer). Sorbent media combined with a suitable binder (e.g., bonded carbon) or captured on or in a suitable support such as described in U.S. Pat. No. 3,971,373 (Braun et al.), U.S. Pat. No. 4,208, 194 (Nelson) and U.S. Pat. No. 4,948,639 (Brooker et al.) and in U.S. Patent Application Publication No. US 2006/0096911 A1 (Brey et al.) may also be employed. Additionally immobilized carbon may also be useful. Carbon may be immobilized in a variety of ways such as in bonded carbon, carbon loaded webs, carbon blocks, and the like. Examples of immobilized carbon include the particle-containing fibrous webs described in PCT Publication No. WO 2006/052694 (Brey et al.). Activated carbon is a particularly useful sorbent material. Examples of commercially available activated carbons include those from Kuraray Chemical Co. as the GG (General Gas) grade and the GC grade (a high purity and high hardness activated carbon used as a catalytic carrier). The Kuraray GG grade activated carbon is particularly suitable for the first sorbent layer.

The filter media also comprises a second sorbent layer. This second sorbent layer is located in closer proximity to the gas outlet and is typically smaller than the first sorbent layer. In saying that the second sorbent layer is smaller than the first sorbent layer, it is meant either that the cross sectional thickness of the second sorbent layer is less than the cross sectional thickness of the first sorbent layer, that the volume within the filter cartridge housing occupied by the second sorbent layer is less than the volume within the filter cartridge housing occupied by the first sorbent layer, or both.

While the second sorbent layer is smaller than the first sorbent layer, the second sorbent layer has a higher adsorption capacity and/or higher adsorption rate than the first sorbent layer. In general terms this means that the second sorbent is a more efficient layer at adsorbing organic vapors than the first sorbent layer. Since the second sorbent layer is smaller than the first sorbent layer, this increased efficiency of adsorption permits the second sorbent layer to keep the filter cartridge functioning and gives the user time to either leave the contaminated area or replace the filter cartridge before contamination breakthrough occurs.

In some embodiments, the ratio of $A_2$, the Adsorption Factor for the second sorbent layer, to $A_1$, the Adsorption Factor for the first sorbent layer, is $A_2/A_1>1$. The Adsorption Factor for a sorbent layer is determined from the formula: $A=k_v \times SL$, where A=Adsorption Factor; $k_v$=effective adsorption rate coefficient (minutes$^{-1}$); and SL=Service Life (minutes), the time required to reach 1% breakthrough of a given challenge vapor at standard temperature and pressure.

This Adsorption Factor determination is made using the methodology described by Wood in the *Journal of the American Industrial Hygiene Association*, Volume 55(1), pages 11-15, (1994).

The sorbent material in the second sorbent layer is different from the sorbent material of the first sorbent layer. Examples of suitable sorbent materials include, for example, activated carbon, treated activated carbon, alumina, silica gel, hopcalite, molecular sieves, metal-organic frameworks, templated materials, or other known sorbent materials, or a combination thereof. Activated carbon is a particularly useful sorbent material. Examples of commercially available activated carbons include those from Kuraray Chemical Co. as the GG (General Gas) grade and the GC grade (a high purity and high hardness activated carbon used as a catalytic carrier). The Kuraray GC grade activated carbon is particularly suitable for the second sorbent layer. In some embodiments, the both the first and the second sorbent layers comprise activated carbon. In some specific embodiments, the first sorbent layer comprises Kuraray GG grade activated carbon and the second sorbent layer comprises Kuraray GC grade activated carbon.

The first and second sorbent layers are in fluid communication with each other. In some embodiments, the first and second sorbent layers are directly adjacent to each other. In other embodiments, the first and second sorbent layers are discreet layers and may be separated by a porous membrane or screen.

The first and second sorbent layers may be in any suitable shapes such as rectangular, round, oval, etc. Typically, the shape of the first and second sorbent layers is controlled by the shape and configuration of the filter cartridge housing. It may be desirable for the first and second sorbent layers to have equal or similar lengths and widths, or it may be desirable for the second sorbent layer to have a shorter length and/or width and for the filter media to have a generally tapered structure.

The filter cartridge further comprises a sensing element located adjacent to the first and second sorbent layers. The sensing element includes at least one indicator element located at the interface between the first and second sorbent layers. The sensing element indicates the passage of the adsorption wavefront through the filter cartridge. A wide variety of sensing elements are suitable for use in the filter cartridges of this disclosure. The sensing element is optically responsive to an analyte, for example, by undergoing a change in at least one of its optical properties (as may be manifested by a colorimetric change, a change in brightness, intensity of reflected light, etc.) when the adsorption wavefront passes through the first sorbent layer. In some embodiments the sensing element is a colorimeteric sensing element (meaning a optical change is detectable by the human eye) in other embodiments the sensing element is an electronic sensing element (meaning the optical change is detectable by a electronic device). In some embodiments, the indicator element that is located at the interface between the first and second sorbent layers may comprise the entire sensing element, in other embodiments, the sensing element is larger or more complex and only the indicator element is located at the interface between the first and second sorbent layers.

In some embodiments the sensing element is a film. The film may have multiple layers and may be a colorimetric film (i.e. the film changes color upon exposure to an organic analyte), or may undergo some other detectable optical change upon exposure to an organic analyte. Examples of suitable sensor films are described in U.S. Pat. No. 7,449,146 (Rakow et al.) and US Patent Publication Nos. 2008/0063575 and 2008/0063874 (Rakow et al.).

The sensing element may also be a patterned chemical sensor such as those described in US Patent Publication No. 2011/0094514 (Rakow et al.). These patterned sensors comprise a film that includes a film body that comprises a detection layer and an occluding layer that is bound to the film body and occludes a portion of the detection layer. The detection layer is responsive to an organic chemical, i.e. the detection layer changes color upon exposure to the organic chemical. The occluding layer precludes the chemical to be detected from accessing the occluded area and causing the color change. The net effect of this arrangement is that in a single film body, upon exposure to an organic chemical, the "old" color (that is to say the initial color state) of the detection layer and the "new" color (that is to say the changed color state of the detection layer) are present side by side, permitting the user to readily determine if a change has occurred.

Depending upon the complexity of the sensing element, the entire sensing element may be located within the filter cartridge, or a portion of the sensing element may be located within the filter cartridge and a portion of the sensing element may be located outside the filter cartridge. This is especially true with electronic sensing elements.

In some embodiments, the entire sensing element is located within the filter cartridge. Typically, in these embodiments the sealed filter cartridge housing contains a window or other viewing device to permit a user to view the sensing element. The window or other viewing device may be made from glass or a transparent plastic. An example of such an arrangement is described in US Patent Publication No. 2010/0294272 (Holmquist-Brown, et al.).

While the sensing element may be located anywhere within the filter cartridge as long at least a portion is present at the interface between the first and second sorbent layers, in some embodiments it may be desirable that the sensing element be located on the wall of the sealed filter cartridge housing. In this way the sensing element signal, either optical or electronic, is readily transmitted to the user. In some embodiments with colorimetric sensing elements, the colorimetric sensing element is located on the wall of the sealed filter cartridge housing directly adjacent to a window or other viewing device.

Figure 2:
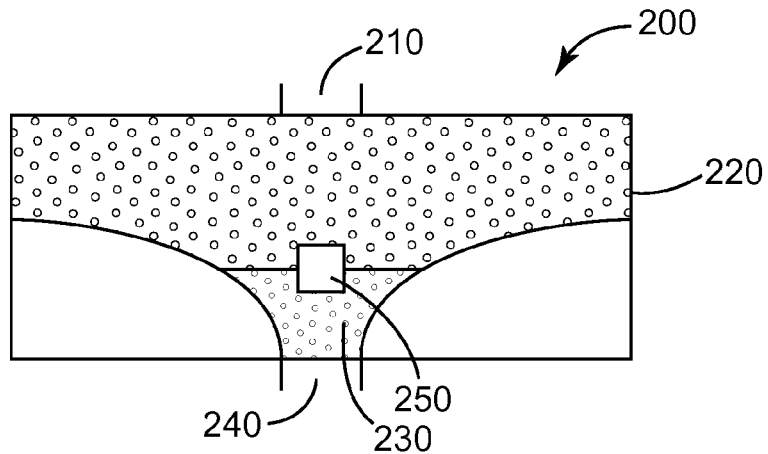
FIG. 2 shows a cross sectional view of an embodiment of a filter cartridge of this disclosure.
Figure 3:
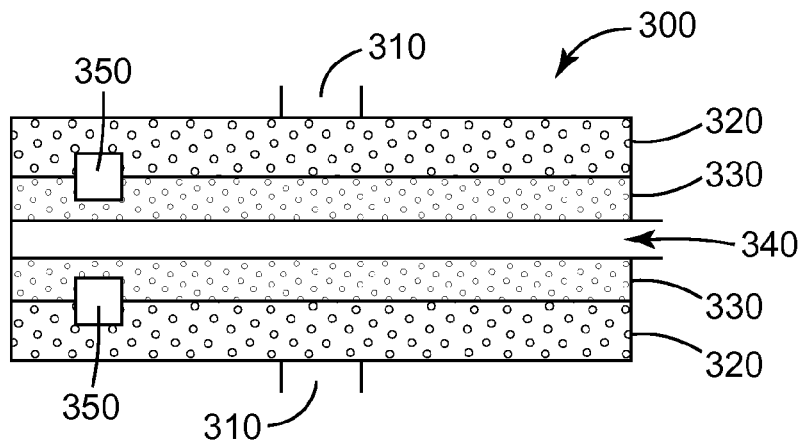
FIG. 3 shows a cross sectional view of an embodiment of a filter cartridge of this disclosure.

Three embodiments of filter cartridges of this disclosure are shown in FIGS. 1, 2, and 3. In FIG. 1, filter cartridge 100 includes gas inlet 110, first sorbent layer 120, second sorbent layer 130, gas outlet 140, and sensing element 150. FIG. 2 is a similar embodiment, showing filter cartridge 200 which includes gas inlet 210, first sorbent layer 220, second sorbent layer 230, gas outlet 240, and sensing element 250. In filter cartridge 200, second sorbent layer 230 is narrower than first sorbent layer 220, giving the filter media a generally tapered structure. FIG. 3 shows an embodiment of a split flow filter cartridge, 300. In filter cartridge 300, gas inlets 310 are located at the top and bottom of filter cartridge 300. The gas inlets 310 are in fluid communication with first sorbent layers 320, second sorbent layers 330, gas outlet 340, and sensing elements 350.

Also disclosed are methods for filtering contaminants from a gas. The methods comprise providing a filter cartridge of the type described above that includes a sealed cartridge housing with layered sorbent layers and a sensing element, causing gas to flow through the filter cartridge, detecting a sensing response in the sensing element, and replacing the filter cartridge.

The gas contaminants typically comprise organic vapors, acid gases, or a combination thereof. The term "organic vapor" as used herein, refers to a wide range of volatile airborne organic compounds that may be hazardous to people if present in the air they breathe. Examples of organic vapors include, but are not limited to: alcohols such as isopropanol and butanol; alkanes such as hexane, and octane; aromatics such as benzene, toluene, xylenes, and styrene; halocarbons such as chloroform, and methylene chloride; ketones such as acetone, and methyl ethyl ketone; ethers such as tetrahydrofuran; esters such as ethyl acetate, and ethoxyethyl acetate; acrylates such as methylacrylate; nitriles such as acetonitrile; isocyanates such as toluene-2,4-diisocyanate; and the like. As used herein, the term "acid gases or acidic gases" refers to gases that contain some acidic component. The acidic component may itself be a gas, such as, for example hydrogen chloride gas, but the acidic component need not itself be a gas, but may merely be present in the gas or gas mixture. Additionally, acidic gases may not themselves be acids but acids may result from combination with other materials present in the atmosphere.

As discussed above, the filter cartridges have at least a first sorbent layer, a second sorbent layer closer in proximity to the gas outlet of the filter cartridge than the first sorbent layer, and a sensing element adjacent to the first and second sorbent layers. At least one indicator element of the sensing element is located at the interface between the first sorbent layer and the second sorbent layer.

Causing gas to flow through the filter cartridge can be effected in a variety of ways depending upon the type of respirator device to which the filter cartridge is attached. If the respirator device is a passive respirator, causing gas to flow through the filter cartridge can comprise donning the respirator and breathing. The filter cartridge gas inlet may be sealed or covered to protect the filter cartridge until it is to be used, so causing gas to flow through the filter cartridge may also include steps of unsealing or uncovering the filter cartridge inlet. Additionally, the respirator and filter cartridges may be kept separate so there may be an assembly step involving attaching of the filter cartridge to the respirator apparatus. Also, the respirator may contain more than one filter cartridge and these filter cartridges may be the same or different.

If the respirator is a powered respirator, causing gas to flow through the filter cartridge can comprise donning the respirator and turning on the power to the fan or other device used to power the respirator. As with the passive respirator system causing gas to flow through the filter cartridge may also include steps of unsealing or uncovering the filter cartridge gas inlet or assembly of the respirator.

As the respirator device that contains the filter cartridge of this disclosure is used, a point is reached in which the first sorbent layer reaches the end of its useful life. At this point the indicator element located at the interface of the first and second sorbent layers is activated and causes a response in the sensing element. The sensing element response is typically optical. If the sensing element is a colorimetric sensing element, a color change occurs that is detectable by the user. If the sensing element is electronic, an electronic signal is generated that is detectable by the user.

In some embodiments, it can useful to test a prototypical filter cartridge against a representative organic vapor and determine the ratio of the End of Service life (as determined by organic vapor breakthrough) to the point at which the sensing element is activated. This process is described more fully in the Examples section. It can be desirable that this ratio be 0.90 or less, meaning that at the time of activation of the sensing element, 10% of the sorbent capacity of the filter cartridge remains. This 10% value for remaining sorbent capacity corresponds to the current NIOSH standard for advance warning of a user to replace a filter cartridge.

Detection of the sensing response by the user is an indication to the user to replace the filter cartridge. An advantage of the present filter cartridge system and method for filtering of contaminants from a gas is that when the sensing response is detected by the user, the adsorption wavefront is just reaching the second sorbent layer. Because the second sorbent layer has a higher adsorption capacity and/or higher adsorption rate than the first sorbent layer, the second sorbent layer is able to continue to adsorb contaminants despite the end of useful life of the first sorbent layer. The second sorbent layer thereby provides an added margin of safety until the filter cartridge can be replaced.

EXAMPLES

These examples are merely for illustrative purposes only and are not meant to be limiting on the scope of the appended claims. All parts, percentages, ratios, etc. in the examples and the rest of the specification are by weight, unless noted otherwise. Solvents and other reagents used were obtained from Sigma-Aldrich Chemical Company; Milwaukee, Wis. unless otherwise noted.

| Table of Abbreviations | |
|---|---|
| Abbreviation or Trade Designation | Description |
| SM-1 | Sorbent Material-1, activated carbon, Kuraray GG 12x20, commercially available from Kuraray Chemical Co. |
| SM-2 | Sorbent Material-2, activated carbon, Kuraray GC 16x35, commercially available from Kuraray Chemical Co. |
| Ppm | Parts per million |
| Cartridge Body | A filter cartridge assembly with a transparent inner wall for viewing an ESLI sensor was prepared as described in U.S. patent publication No. 2010/0294272 (Holmquist-Brown, et al.). |
| Sensor | An ESLI sensor was prepared and placed in the Cartridge Body as described in U.S. patent publication No. 2010/0294272 (Holmquist-Brown, et al.). |

Test Methods

Filter Cartridge Service Life Determination

Service Life was measured by challenging the cartridge against 500 ppm octane challenge at 32 L/min flow and 50% relative humidity. Service life was measured as observing 5 ppm of octane on the outlet. Exit concentration was measured using a GOWMAC Series 23-550 Total Cardrocarbon analyzer FID, made by GowMac Instrument Co. The FID settings were range 2, air pressure 22, fuel pressure 12, Span 1.1.

Comparative Example C1

Preparation of Cartridge C1

Sample filter cartridges were assembled using a Cartridge Body and filled using a snowflake column with 140 cubic centimeters (cm³) of SM-1.

Testing of Cartridge C1:

The cartridges assembled above were tested for End of Service Life using the Test Method described above. The point at which the Sensor in the filter cartridge was activated was also noted. The ratio of the End of Service Life to the point at which the Sensor was activated was also calculated. The ratio measures the time between Sensor activation and breakthrough. It is desirable that the ratio be 0.90 or less to provide a 10% advance warning time for the cartridge user (current NIOSH requirements). These data are presented in Table 1.

TABLE 1

|  | Cartridge C1 |
| --- | --- |
| Average Service Life (min) | 172 |
| Average Time for Sensor Activation (min) | 179 |
| Ratio | 1.04 |

Examples 1-4

Preparation of Cartridges 1-4

Sample filter cartridges were assembled using a Cartridge Body and filled using a snowflake column with the quantities of sorbent materials shown in Table 2. Comparative Example C1 is included as a reference.

TABLE 2

| Layer | Comp. Ex. C1 | Example 1 | Example 2 | Example 3 | Example 4 |
| --- | --- | --- | --- | --- | --- |
| Top Layer | 104 cm³ of SM-1 | 65 cm³ of SM-1 | 65 cm³ of SM-1 | 65 cm³ of SM-1 | 75 cm³ of SM-1 |
| Bottom Layer | — | 40 cm³ of SM-2 | 40 cm³ of SM-2 | 40 cm³ of SM-2 | 30 cm³ of SM-2 |

Testing of Cartridge 1-4:

The cartridges assembled above were tested for End of Service Life using the Test Method described above. The point at which the Sensor in the filter cartridge was activated was also noted. The ratio of the End of Service Life to the point at which the Sensor was activated was also calculated. The ratio measures the time between Sensor activation and breakthrough. It is desirable that the ratio be 0.90 or less to provide a 10% advance warning time for the cartridge user (current NIOSH requirements). These data are presented in Table 3.

TABLE 3

|  | Comp. Ex. C1 | Example 1 | Example 2 | Example 3 | Example 4 |
| --- | --- | --- | --- | --- | --- |
| Average Service Life (min) | 172 | 193 | 200 | 184 | 191 |
| Average Time for Sensor Activation (min) | 179 | 170 | 171 | 159 | 173 |
| Ratio | 1.04 | 0.88 | 0.86 | 0.86 | 0.90 |

What is claimed is:

1. A filter cartridge capable of removing contaminants from a gas medium comprising;
   a sealed cartridge housing comprising:
      a gas inlet;
      filter media; and
      a gas outlet,
      wherein the filter media comprises a multi-layer construction comprising:
         a first sorbent layer;
         a second sorbent layer closer in proximity to the gas outlet than the first sorbent layer; and
         a sensing element adjacent to the first and second sorbent layers such that an indicating element of the sensing element is located at the interface between the first and second sorbent layers.

2. The filter cartridge of claim 1, wherein the second sorbent layer has a higher adsorption capacity and/or higher adsorption rate than the first sorbent layer.

3. The filter cartridge of claim 2, wherein the ratio of $A_2$, the Adsorption Factor for the second sorbent layer, to $A_1$, the Adsorption Factor for the first sorbent layer, is $A_2/A_1 > 1$, wherein the Adsorption Factor for a sorbent layer is determined from the formula:

$$A = k_v \times SL,$$

wherein A=Adsorption Factor;
$k_v$=effective adsorption rate coefficient (minutes$^{-1}$); and
SL=Service Life (minutes), the time required to reach 1% breakthrough of a given challenge vapor at standard temperature and pressure.

4. The filter cartridge of claim 1, wherein the first sorbent layer and the second sorbent layer are substantially discrete layers.

5. The filter cartridge of claim 1, wherein the sensing element indicates the passage if the adsorption wavefront through the filter cartridge.

6. The filter cartridge of a claim 5, wherein the sensing element comprises a colorimeteric sensing element or an electronic sensing element.

7. The filter cartridge of claim 1, wherein the sensing element is located within the filter cartridge at a location such that the sensing element indicates when an adsorption wavefront containing a contaminant reaches the interface between first and the second sorbent layers.

8. The filter cartridge of claim 1, further comprising additional sorbent layers.

9. The filter cartridge of claim 1, wherein the first and the second sorbent layers comprise layers of activated carbon, silica, alumina, or combinations thereof.

10. The filter cartridge of claim 9, wherein the first sorbent layer comprises an activated carbon the second sorbent layer comprises a different activated carbon.

11. The filter cartridge of claim 1, wherein the sensing element is located on the wall of the cartridge housing.

12. A method of filtering contaminants from a gas, comprising:
  providing a filter cartridge, the filter cartridge comprising:
    a sealed cartridge housing comprising:
      a gas inlet;
      filter media; and
      a gas outlet,
    wherein the filter media comprises multi-layer construction comprising:
      a first sorbent layer;
      a second sorbent layer closer in proximity to the gas outlet than the first sorbent layer; and
      a sensing element adjacent to the first and second sorbent layers such that an indicating element of the sensing element is located at the interface between the first and second sorbent layers;
  causing gas to flow through the filter cartridge;
  detecting a sensing response in the sensing element; and
  replacing the filter cartridge.

13. The method of claim 12, wherein the second sorbent layer has a higher adsorption capacity and/or higher adsorption rate than the first sorbent layer.

14. The method of claim 13, wherein the ratio of $A_2$, the Adsorption Factor for the second sorbent layer, to $A_1$, the Adsorption Factor for the first sorbent layer, is $A_2/A_1 > 1$, wherein the Adsorption Factor for a sorbent layer is determined from the formula:

$$A = k_v \times SL,$$

wherein A=Adsorption Factor;
$k_v$=effective adsorption rate coefficient (minutes$^{-1}$); and
SL=Service Life (minutes), the time required to reach 1% breakthrough of a given challenge vapor at standard temperature and pressure.

15. The method of claim 12, wherein the first sorbent layer and the second sorbent layer are substantially discrete layers.

16. The method of claim 12, wherein the sensing element indicates the passage of the adsorption wavefront through the filter cartridge.

17. The method of a claim 16, wherein the sensing element comprises a colorimeteric sensing element or an electronic sensing element.

18. The method of claim 17, wherein detecting a sensing response in the sensing element comprises detecting a color change.

19. The method of claim 12, wherein the sensing element is located within the filter cartridge at a location such that the sensing element indicates when an adsorption wavefront containing a contaminant reaches the interface between first and the second sorbent layers.

20. The method of claim 12, wherein the filter cartridge further comprises additional sorbent layers.

21. The method of claim 12, wherein the contaminants comprise organic vapors, acid gases, or a combination thereof.

* * * * *